(12) United States Patent
Wallingford

(10) Patent No.: US 6,339,301 B1
(45) Date of Patent: Jan. 15, 2002

(54) AC MOTOR CONTROL FOR A VEHICLE HAVING A MULTI-SPEED TRANSMISSION— II

(76) Inventor: Errol E. Wallingford, 1019 Lavender Lane, Sydenham, Ontario (CA), K0H 2T0

(*) Notice: Subject to any disclaimer, the term of this patent is extended or adjusted under 35 U.S.C. 154(b) by 0 days.

(21) Appl. No.: 09/676,775

(22) Filed: Oct. 2, 2000

(51) Int. Cl.⁷ .................. B61C 15/12; B60K 1/00; H02P 17/00
(52) U.S. Cl. ............ 318/52; 318/139; 477/15; 180/65.6
(58) Field of Search ............ 318/52, 139, 799, 318/811, 434; 388/806, 815; 180/65.1–65.8; 477/15, 20; 363/41, 132

(56) References Cited

U.S. PATENT DOCUMENTS

| | | | | |
|---|---|---|---|---|
| 3,628,621 A | * | 12/1971 | Lee | 180/65.8 |
| 3,984,742 A | * | 10/1976 | Bader | 180/65.1 |
| 4,849,871 A | * | 7/1989 | Wallingford | 318/811 |
| 5,758,014 A | * | 5/1998 | Young | 318/434 |

* cited by examiner

*Primary Examiner*—Khanh Dang
(74) *Attorney, Agent, or Firm*—David J. French

(57) ABSTRACT

A control system for an AC electric motor on an electric vehicle deactivates the motor when the control system senses a shift in the mechanically coupled transmission extending between the motor rotor and the wheels. The transmission shift condition may be detected by comparing the current transmission ratio to the immediately preceding measured transmission ratio. If these differ, the motor is electrically deactivated. Two successive measures of the same transmission ratio in a range corresponding to a valid transmission ratio indicate the end of a transmission shift hence permitting the safe resumption of excitation of the motor based on the then current measured rotor speed.

9 Claims, 5 Drawing Sheets

AC MOTOR CONTROL FOR A VEHICLE HAVING A MULTI-SPEED TRANSMISSION—II

FIELD OF THE INVENTION

This invention relates to AC motor controllers for vehicles having an electrical drive. In particular it relates to the integration of an AC motor into a vehicle having a multi-speed transmission as part of the power train connecting the motor to the wheels in a system that provides for regenerative braking.

BACKGROUND TO THE INVENTION

Existing AC motor systems for electric vehicles use a fixed overall gear reduction ratio generally of about 12:1. The measured rotor speed in such installations is a reliable guide for setting the desired speed of the rotating field in the stator's field windings. For accelerating a small increase is effected in the field windings rotational speed, over the speed of rotation of the rotor. For decelerating (also called regenerative retard), a small decrease in such speed is required. Expensive, specially designed motors which can operate at very high rpms are required to attain a speed of 100 km/h in a typical AC powered vehicle when a fixed gear ratio is employed.

When an electric vehicle is equipped with a typical 4 speed manual transmission overall reduction ratios of 15:1, 8.3:1, 5.6:1 and 3.9:1 are available. At 100 km/h in $4^{th}$ gear the motor only has to turn at 3660 rpm. At this speed the motor is very efficient and standard, inexpensive industrial AC induction motors can be used.

In an electric vehicle having a shifting transmission, prior to shifting the rotor will be turning at a speed that corresponds to the vehicle wheel speed, as modified by the transmission ratio. After shifting, when the rotor is mechanically reconnected to the wheels through the transmission, the rotor will be turning at a new speed, again dictated by the wheel speed and transmission ratio combined.

The shift between $1^{st}$ and $2^{nd}$ transmission ratios is typically a change of 45% which is too large for existing AC controllers to handle.

A mechanical shock will occur when the rotor reconnects to the wheels and readjusts to the new speed dictated by the wheels through the powertrain. But a rotor is relatively light and will conform quickly to the new speed requirement. However, an electrical mismatch can arise when this reconnection occurs. And this electrical mismatch has more serious consequences.

In an AC motor the field coil, to operate effectively, must produce a magnetic field that is rotating at a speed that corresponds to the speed of rotation of the rotor. In a synchronous AC motor, these speeds will be the same. In an asynchronous, induction AC motor, these speeds will differ by the slip that is present. But, with an allowance for slip, the rotational velocity of the stator field will "correspond" to the mechanical rotational speed of the rotor. These conditions apply when the AC motor is operating effectively.

The current waveform fed to the field coil of a variable speed AC motor must be constructed by a wave-form generating motor controller to create a rotating magnetic field. This waveform has a frequency of oscillations that will deliver a rotating magnetic field of appropriate rotational velocity within the stator coils of the motor. It is the function of an AC motor controller to deliver to the stator winding of an AC motor a field coil activating current of appropriate frequency the stator winding of an AC motor that corresponds to the rotational velocity of the rotor.

When an AC motor experiences a transmission shift, if a substantial mismatch occurs between the stator field's rotational velocity and the rotor's rotational speed, then there can be a severe reduction of torque. Further, electrical transients may occur that expose the AC motor control system to voltage or current spikes that require protective features and protocols to be included in such system.

As an example, when upshifting from first to second gear at say 30 km/h the rotor may be initially turning at 4150 rpm. After the shift it may be turning at only 2296 rpm. If the controller were asked to continue driving the field coil at 4150 rpm following the shift, a dangerous stall condition could arise. At best a long delay would occur before the rotor would accelerate to its proper speed. Downshifting is even worse. A downshift from second to first at 30 km/h calls for a typical change in rotor rpm of from 2296 rpm to 4500 rpm. If the field winding of the motor is still powered at the old speed of 2296 rpm following this shift, then a large negative slip condition will arise and pour considerable energy back into the batteries through the motor control circuitry. This can easily raise the instantaneous voltage applied to the electrical circuitry to a breakdown value. For example, the snubber capacitors and IGBT's (internal gate bipolar transistors) components in a controller could fail.

The present invention addresses a means by which an AC motor controller in an electrically powered vehicle may accommodate a transmission shift without exposing the system to prejudicial electrical consequences.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

To ensure that a mismatch of the stator field rotational velocity for an AC motor does not arise during a gear change, it is a feature of the invention to provide a means for suspending the flow of current to the field coils of the motor when a transmission ratio shift is in progress. According to one variant of the invention the provision of current to the field coil is suspended when the rotor-to-motor speed ratio has departed from a value that is consistent with there being a mechanical connection between the rotor and the wheels. This can be established by detecting a change in such ratio that can only arise when a transmission shift is in progress.

According to another variant of the invention motor speed and wheel speed are monitored on a continuous basis. A controller then proceeds to divide the smaller wheel rpm into the larger motor rpm (or vice versa). If this value is not substantially within the range of known transmission ratios, the motor may be considered to be disengaged from the wheels. In any of these conditions, the controller should, in an abundantly cautious system, immediately suspend activation of the field coils. Alternately, combinations of such conditions may be required.

Reactivation of the field coil is only permitted to occur when the rotor has stabilized at a new rotational speed that corresponds to re-engagement of the rotor to the vehicle wheels. The excitation of the field coils is then reactivated at a rotational velocity that is within a few percent of the rotor's measured velocity, according to the slip condition that is required, if slip is to be present. Whether positive or negative torque is to be generated within the motor is then established by input from the operator.

Reactivation thus occurs proceeding from an inactivated or unpowered state only once the rotor speed has stabilized. This avoids an undesirable mismatch between the field coil excitation velocity and the rotor speed.

The re-powering of the motor may be made subject to analogous tests to those described above. If the resultant ratio value for wheel speed vs rotor speed is close to one of the expected ratios for the transmission, and preferably, if the present measured ratio is the same, within an acceptable tolerance, as the most recently measured previous ratio, then the clutch may be considered to be engaged and the motor's rotary speed may be considered to be reliable for control purposes. It is at this stage that the field coil may be re-excited with the appropriate rotational velocity.

An important condition for re-powering of the motor is that the measured ratio is within the range of permitted ratios. A supplementary test of comparing consecutively measured ratios, vis when two successive measures of motor and wheel rpm both yield, effectively, the same ratio value, can be added to ensure that the measured rotor rpm can be safely used as an input for control purposes, permitting waveform generation for the field coils to be restored. Circuitry to ensure this effect serves as a confirmatory engagement means.

As additional preferred features the following procedures may be applied. Wheel rpms based on measurements on only one wheel are exact when the vehicle is travelling in a straight line. When going around curves true vehicle speed is best made using two (opposite) wheel speed sensors whose results are added, then divided by two.

An alternate strategy is to use only one wheel speed sensor and allow a liberal amount or range for acceptable transmission ratios for the lower gear ratios. Since tight turning is only going to occur at low speeds, the tolerated acceptable ratios at high speeds can be, and should preferably be, more stringent. If allowed or accepted values are of too broad a range, then delays in disabling the waveform during shifts could be a problem. If too narrow, delays before resuming waveform generation following a shift could be needlessly prolonged. Skilled workmen testing the alternatives will be readily able to establish the preferred range.

For startup conditions, the vehicle wheel rpm is zero and the above wheel speed to rotor speed ratio strategy will not be effective. A divide-by-zero condition arises. In this case it is permissible for the controller to activate the field coil with an arbitrary, but low, rotational velocity. This may be allowed when first gear or reverse gear conditions are occurring, both of which have high gear reduction values, e.g. 15:1 suited for very low vehicle wheel rpms. The field coil may be activated at a rotation velocity which is a greater mismatch with rotor speed under these conditions. Attempting to start in higher ratios is not serious, other than that insufficient torque may be available for start-up.

The strategy of the invention for making successful transmission upshifting or downshifting permits the AC motor, or motor acting as a generator in regeneration mode, to be operated in combination with the transmission in its most efficient regime, its "sweet zone", for optimal efficiency for all but short durations during start-ups and final braking stops. It does not prevent motor breakdown due to motor overloading, such as attempting to climb too steep a hill too fast. Therefore, usual motor overloading protection measures are still required. Similarly, regenerative current-limiting provisions should be used to protect against system failure.

An important step in the procedures of the invention is establishing wheel speed. This has been done in the past by mounting wheel speed sensors at the wheels. As the wheels are free for vertical movement within the limits provided by the suspension, it is inconvenient to mount wheel speed sensors at the wheels.

A recommended type of sensor for determining wheel speed is a new type of inner CV joint type wheel speed sensor which is preferred over existing multi-toothed wheel disk type speed sensors now in common use for "abs" braking. As depicted in U.S. Pat. No. 6,082,195, the contents of which are adopted herein by reference, the wheel speed of wheels driven from a trans-axle transmission is measured by sensing the rotational speed of the axle drive shaft as it emerges from the trans-axle transmission case.

Typically, the shaft extending from the trans-axle case terminates at a constant velocity-CV-joint. A typical configuration for a CV joint provides an outer cylindrical sleeve that is interrupted by cut-out portions. One of these sleeves usually rotates in alignment with the protruding shaft of the trans-axle transmission case. The speed of rotation of this sleeve can be measured by mounting a Hall effect proximity detector or similar speed sensor positioned adjacent to the sleeve at a position where the cut-out portions will rotate proximately past the sensor. As this sleeve turns coaxially with the trans-axle transmission shaft, this sensor can conveniently be mounted on the trans-axle casing, avoiding the cost and inconveniences of mounting the sensor on the wheel assembly and installing a multi-tooth indexing disc inside the wheel assembly.

The foregoing summarizes the principal features of the invention and some of its optional aspects. The invention may be further understood by a description of the preferred embodiments, in conjunction with the drawings, which now follow.

DESCRIPTION OF THE PREFERRED EMBODIMENT

Figure 1:
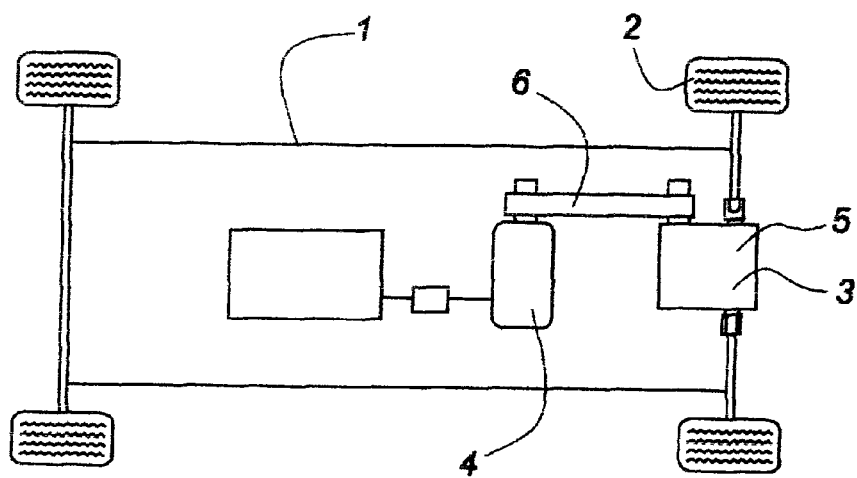
FIG. 1 is a schematic plan view of an electric vehicle chassis carrying the motor control system of the invention.

In FIG. 1 a schematic plan view depicts an electrical vehicle chassis 1 having wheels 2, and carrying a transmission 5 within a transaxle case 3 and an AC electric motor 4. The linkages between the motor 4 and wheels 2 constitute the vehicle power train. For convenience of depiction, the AC motor 4 is shown as connected to the transmission 3 by a belt drive 6 whereas in practice the motor turns the flywheel and is mounted directly on the clutch housing of the transaxle.

Figure 2:
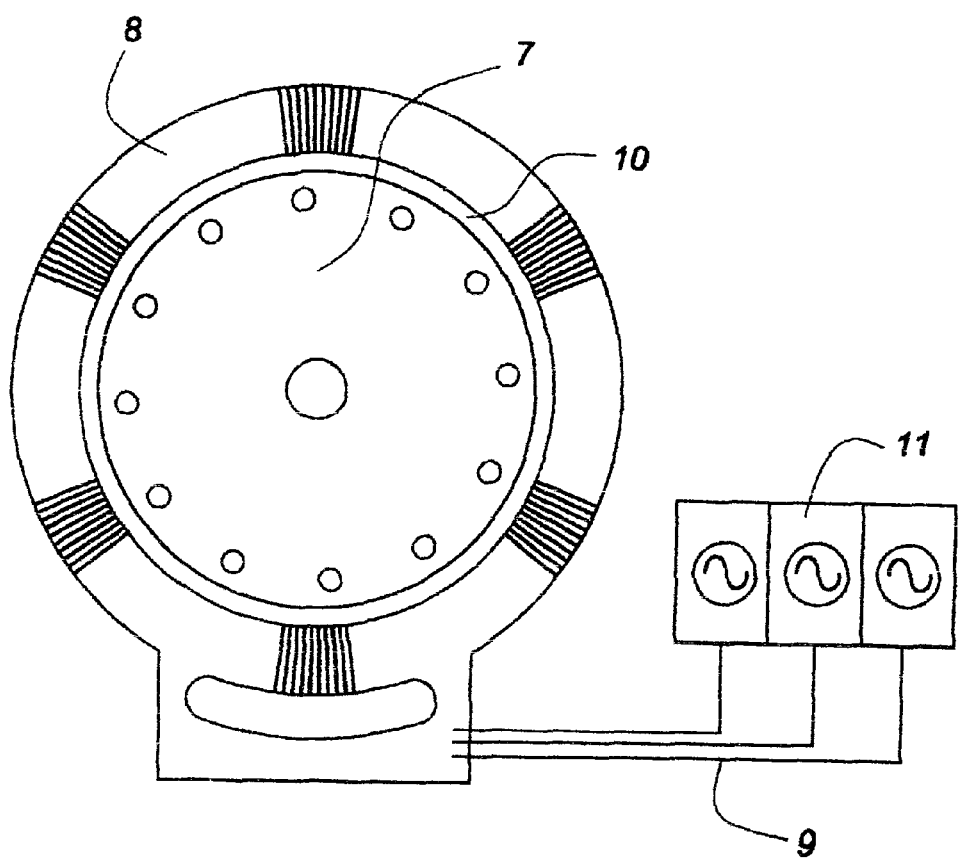
FIG. 2 is a partial cut-away cross-sectional schematic end view of an AC motor depicting a squirrel cage rotor and field coils.

As shown in FIG. 2 the motor 4 has a rotor 7 and a stator field coil 8. Current is fed through wires 9 to the field coil 8, in three phases, creates a magnetic field 10 both adjacent the field coil 8 and around the rotor 7. A typical motor has a three phase winding and is driven by three wave form generators 11 connected through the wires 9 for a half wave bridge, and six wires for a full wave bridge, to the field coil 8.

The combined magnetic fields created by the wave form generators 11 produce effectively a rotating magnetic field 10 between the stator coils 8 and the rotor 7.

Figure 3:
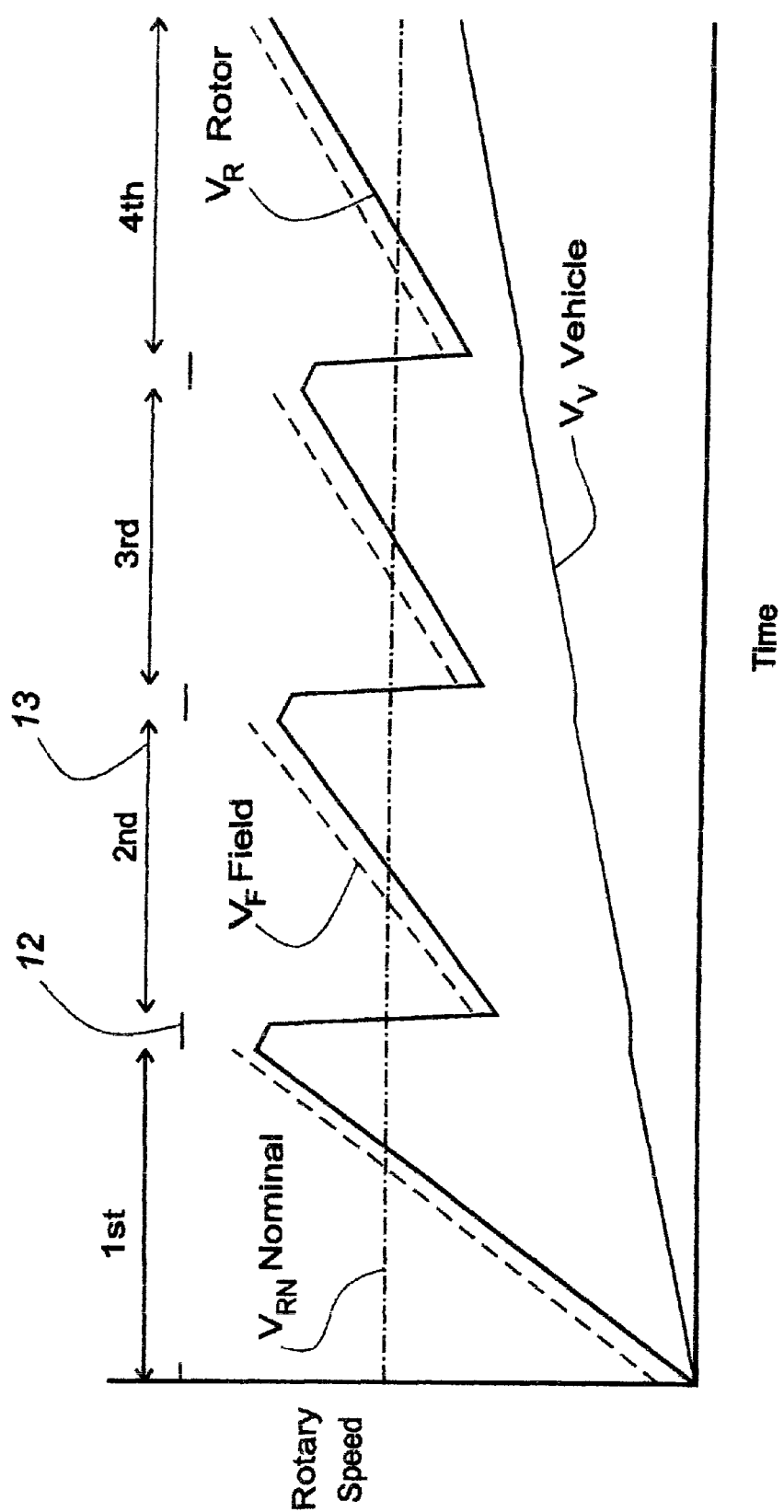
FIG. 3 is a graph showing vehicle, (power train) and motor field coil and rotor speeds as these vary over time with the vehicle speeding up and the transmission shifting through four ratios. Also depicted in the graph as an overlay is a curve showing the gear ratios of the transmission at four stages.

In FIG. 3 a graph depicts the rotary $V_V$ speed of the vehicle wheels, as such speed increases linearly over time. The vehicle wheel speed $V_V$ governs in turn the rotary speed $V_R$ of the rotor 7 when the transmission 5 is engaged, in accordance with the state of the transmission ratio 13. Thus the speed $V_R$ of the rotor 7 varies with respect to the vehicle speed $V_R$ as the transmission shifts over four stages of transmission ratios 13.

FIG. 3 is a transmission upshift diagram. When the transmission 5 is disengaged from the motor 4 the rotor speed $V_R$ continues momentarily at virtually its current speed, slowing slightly until the transmission 5 is at least partially re-engaged. The light weight rotor is then no match for the large vehicle momentum and quickly drops in its speed.

The wheel-to-rotor ratio $V_V/V_R$ is being continuously sampled by the control system. Upon disengagement the next set of motor rpm divided-by wheel rpm readings will detect a change in transmission ratio status and the wave form command circuitry 19 of the controller 16 immediately sends a deactivation signal 20a to disable the waveform generator drivers 11. Thus deactivation of the motor 4 can be effected simply on the basis of detecting a change in the wheel-to-rotor speed ratio. A comparison is also made between such ratio and a table of permitted ratios. If a non-permitted ratio is sensed then a deactivation signal 20a will be similarly sent.

An activation signal 20 is only sent when the measured ratio stabilizes at a permitted value. As soon as two successive measures of the same transmission ratio within a valid, permissible range are indicated, the rotor speed $V_R$ can be safely used for control purposes to set the field coil rotational velocity $V_F$. For purposes of comparing consecutive ratios, and for looking-up permissible values, the ratio value may be truncated to the number of significant figures that are suitable for system protection. This truncation accounts for tolerance variations in the actual measurements.

FIG. 3 shows the rotational velocity $V_F$ of the magnetic field in the field coil 8 for an AC induction motor based on there being a constant slip in the range of a 5–10% slip present. In actual cases, slip will vary and $V_F$ will not be necessarily parallel to $V_R$ as in a FIG. 3 type diagram.

During each transmission shift change 12, the excitation of the field coil 8 is suspended. Once each shift hiatus 12 ends, the field coil 8 may be re-energized, as outlined above, to provide a magnetic field 10 having a new rotational velocity $V_F$ that corresponds, for example, to providing a 5–10% slip above the new speed $V_R$ of the rotor if continued acceleration of the vehicle is required.

Figure 4:
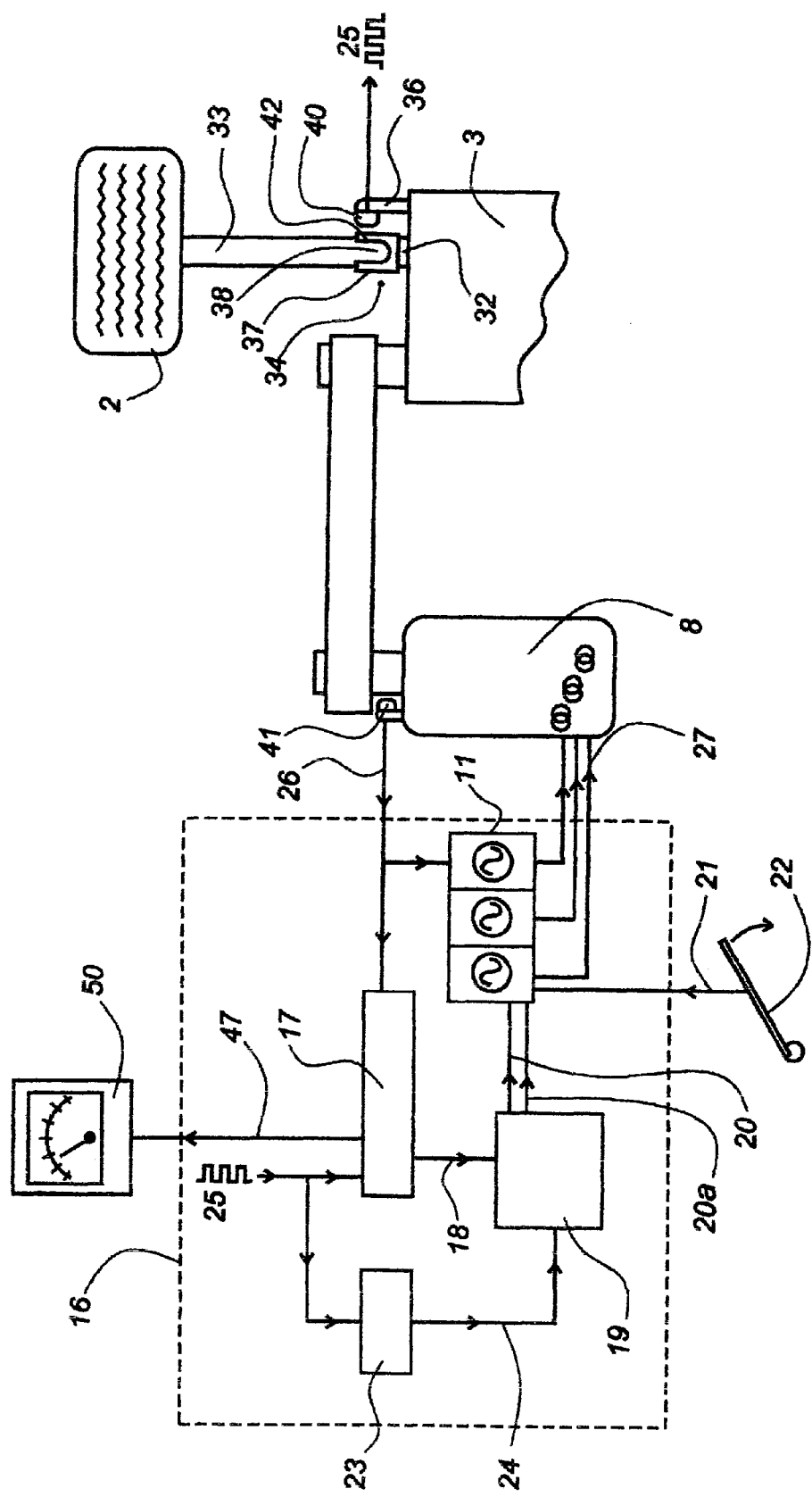
FIG. 4 is a schematic block diagram depicting the interrelationship of the control elements of the motor controller in accordance with the invention, as fed with a wheel rpm signal obtained at a transaxle shaft connected to a driven wheel.

FIG. 4 depicts schematically the control elements that operate in this process.

The driving of a three phase AC induction motor using digital logic is described more fully in U.S. Pat. No. 4,849,871 issued previously to the present inventor, the contents of which patent are adopted herein by reference. In the present invention a wheel speed sensor 40, e.g. a Hall sensor, and rotor speed sensor 41 send wheel speed 25 and rotor speed 26 signals to a controller 16. The computational CPU 17 calculates the ratio and compares the resultant ratios with previously calculated ratios, and optionally for deactivation with a lookup table for the known, valid transmission ratios. The result 18 is provided to waveform command circuitry 19. If a departure from a constant ratio, or optionally from a permitted ratio beyond a permitted tolerance range is indicated, as when the transmission 5 undergoes a shift, then a field deactivation signal 20a is sent immediately to the three field coil current wave form generators 11 from the waveform command circuitry 19. The delivery of current 27 to the field coils 8 then immediately ceases.

Sampling of wheel speed and rotor speed values is repeated on a continuous basis, as is the calculation of the ratio between these two values. If two successive measures of rotor speed 26 and wheel speed 25 provide the same valid ratio, within a permitted range, then an activation signal 20 is sent to the waveform generator 11 and activating currents 27 are sent to the field coils 8.

The waveform generators 11 respond to both the operator input 21 and the rotor speed signal 26 in establishing the new frequency of the activating current 27 to be sent to the field coils 8.

An operator input 21, usually obtained from an accelerator pedal 22, provides an indication as to whether acceleration or deceleration (positive or negative torque) and, correspondingly, positive or negative slip (or zero slip or deactivation for coasting) is required. This signal 21 is fed to the wave-form generators 11 to establish the frequency of the signal of the activating currents 27 being sent to the field coils 8.

An over-ride circuit 23 senses when the wheel speed is very low or stopped. In such case the over-ride circuit 23 provides an over-ride signal 24 that sustains the activation signal 20 in a situation where the waveform command circuit 19 would not normally do so. This accommodates the case of a stopped vehicle.

Thus to permit start-up, the controller 16 may sense when wheel rpm $V_V$ is zero or a low value, below a preset threshold. In such case, the controller 16 may operate on the basis that a valid low gear or reverse transmission mode is in effect. For measured wheel speeds 25 below the preset threshold, torque may be applied in response to a command 21 from the user, e.g. upon depression of an accelerator pedal 22 irrespective of the value of the wheel-to-rotor speed ratio $V_V/V_R$. At low rpms the energy input is so low that even errors in transmission settings will generally only result, at most, in vehicle failure to move.

The use of an override for start could cause excessive regenerative currents to be experienced in starting-up in an unloaded motor 8 with the accelerator pedal 22 depressed, followed by a driver command 21 for reduced speed. This problem has been addressed by ensuring that the motor 4 is engaged to the vehicle on start-up.

Wheel speed measurements are determined in the following manner. In FIG. 4 a wheel 2 is connected to transaxle shaft 32 through drive shaft 33. A CV joint 34 is connected at the ends of transaxle shaft 32, extending from the transaxle case 3. The CV joint 34 mounted at the transaxle shaft 32 has a sleeve 37 interrupted by scalloped cut-out portions 38. This sleeve 37 is mounted to rotate with a protruding portion of the transaxle shaft 32.

A wheel speed sensor 40, operating for example on the basis of the Hall field effect, is mounted through a support 36 on the transaxle case 3. This sensor 40 is positioned to lie adjacent the sleeve 37 at its portions 38 which are cut-out as the sleeve 37 rotates. As the edges 42 of the cut-out portions move past wheel speed sensor 40, they disrupt its magnetic field, creating a pulsed electrical signal 25 in a field coil carried within the sensor 40 that is indicative of wheel speed. These signals 25 are carried-off by wires to the controller 16 for processing.

The signal 25 is processed in the controller 16 which may operate by comparing the duration between the arrival of pulses from the wheel speed sensor 40 to an internally established clock rate to provides as an output speed indication signal 47 that is directed to display 50 to provide an indication of wheel speed.

While a sleeve portion 37 of the CV joint 34 is preferably used to activate the sensor 40, an indexing disc or other equivalent structure carried by transaxle shaft 32 could also be provided. Alternate forms of sensing devices 40 could also be employed.

Figure 5:
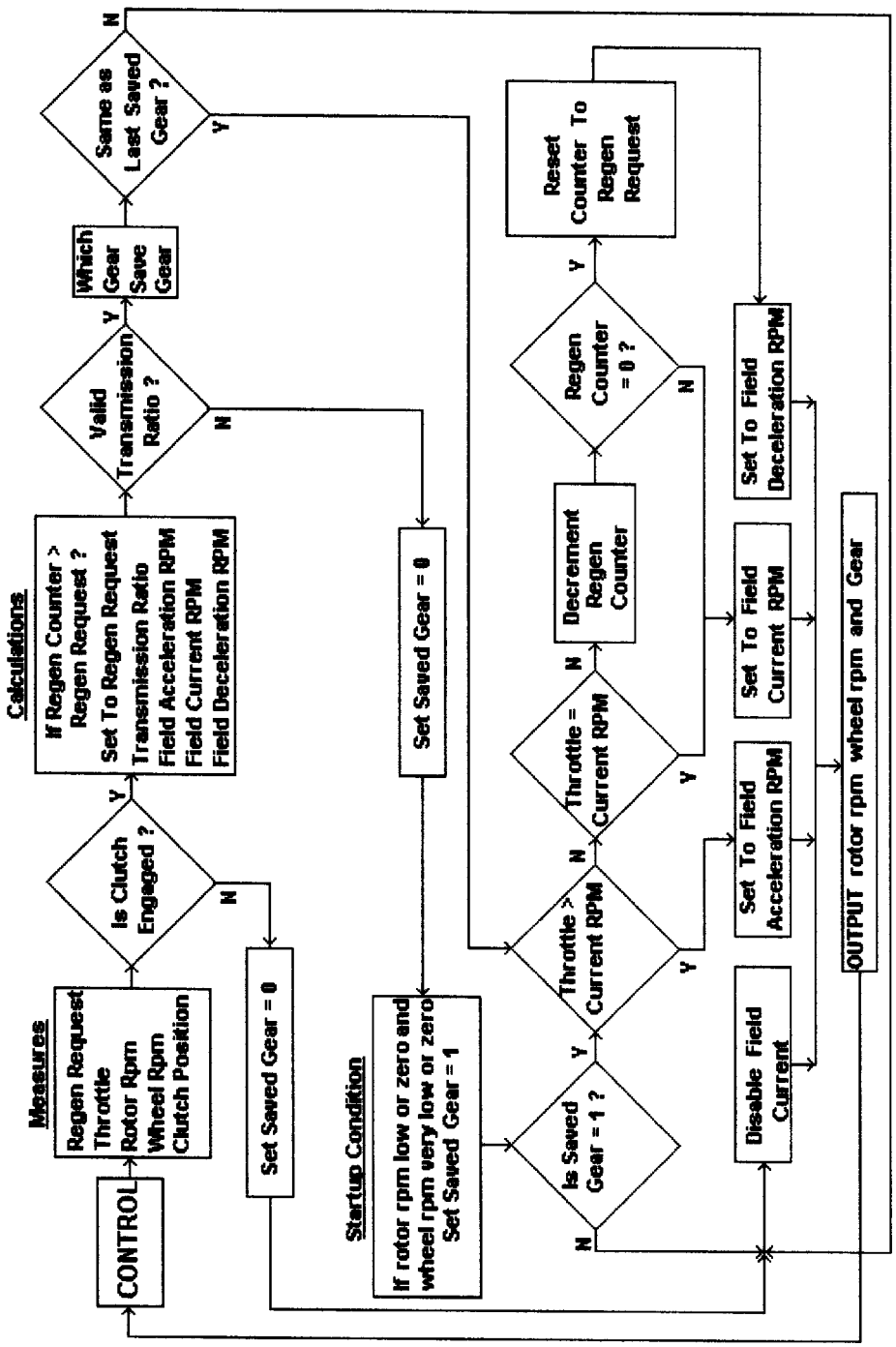
FIG. 5 is a data flow diagram depicting the logic by which the motor control system operates.

FIG. 5 is a flow chart for a control loop for transmission control which repeats continuously. First measurements are made of the regeneration or throttle request, rotor rpm, wheel rpm and optionally the clutch position.

Next an optional test is made to see if the clutch is engaged or not. If not the system acts as if an invalid gear has been set, disabling the field current. The optional test has been found useful for motors which are very lightly loaded at start-up. If the clutch is disengaged and the operator on start-up first accelerates and then eases up on the throttle, the momentum of the flywheel and clutch plate causes them to continue turning at their accelerated rpm with little loss and the lowered field rpm arising from backing-off on the throttle could generate serious regenerative effects if the field rotational velocity differs substantially from the rotor's mechanical speed of rotation. The presence of a clutch interlock forces start-ups to occur under load where the vehicle momentum minimizes regeneration to safe values.

Prior to entering the control loop the regeneration counter is set to a maximum count for minimal regeneration. Under calculations a test is made to see if the regeneration counter is greater than the regeneration request. If so it is set to the count of the regeneration request so the operator can control the amount of regeneration.

A transmission ratio determination is made by dividing the motor rpm by the wheel rpm. Also from a table of discrete possible rpms separated by about 10%, a field rpm just above the current rotor rpm is selected as the effective current field rpm. The next rpm above that is selected as an acceleration rpm. The rpm just below the effective current rpm is selected as a deceleration rpm.

Next the evaluated overall transmission ratio is rounded to its nearest integer value and compared to a set of values all considered to be valid transmission ratios. The exact ratios for a typical 4 speed transmission is for overall ratios to be 15:1 to 1st gear, 8.3:1 for 2nd gear, 5.6:1 for 3rd gear and 4.9:1 for 4th gear. Some latitude in the selection of valid ratios is allowed especially for 1st gear. This permits using only a single wheel speed sensor to be used and prevents rejecting a valid ratio caused by steering. Thus 19,18,17,16, 15,14,13,12,11 may be considered to be valid 1st gears, 9,8,7 valid 2nd gears, 6,5 valid 3rd gears and 4,3 valid $4^{th}$ gears. If none of these values are found, a gear of "zero" is arbitrarily selected as an unsuitable gear signifying a shift in progress and normally calling for an immediate disabling of the field current.

An override condition is required to start the vehicle from rest since either the wheel rpm or the motor rpm or both may be zero and a valid transmission ratio cannot be realized. For the special case of low or zero motor and wheel rpms it is safe to assume first gear as the valid gear.

If a measured transmission ratio corresponding to a valid transmission ratio is subsequently identified its value is saved. Next it is compared with the last saved gear. If these values are different the field current continues to be disabled, or is disabled if not already disabled. If these values are the same then the field current may be safely re-excited for acceleration, or if the deceleration counter has decremented to zero, to a deceleration value according to the throttle request.

Figure 6:
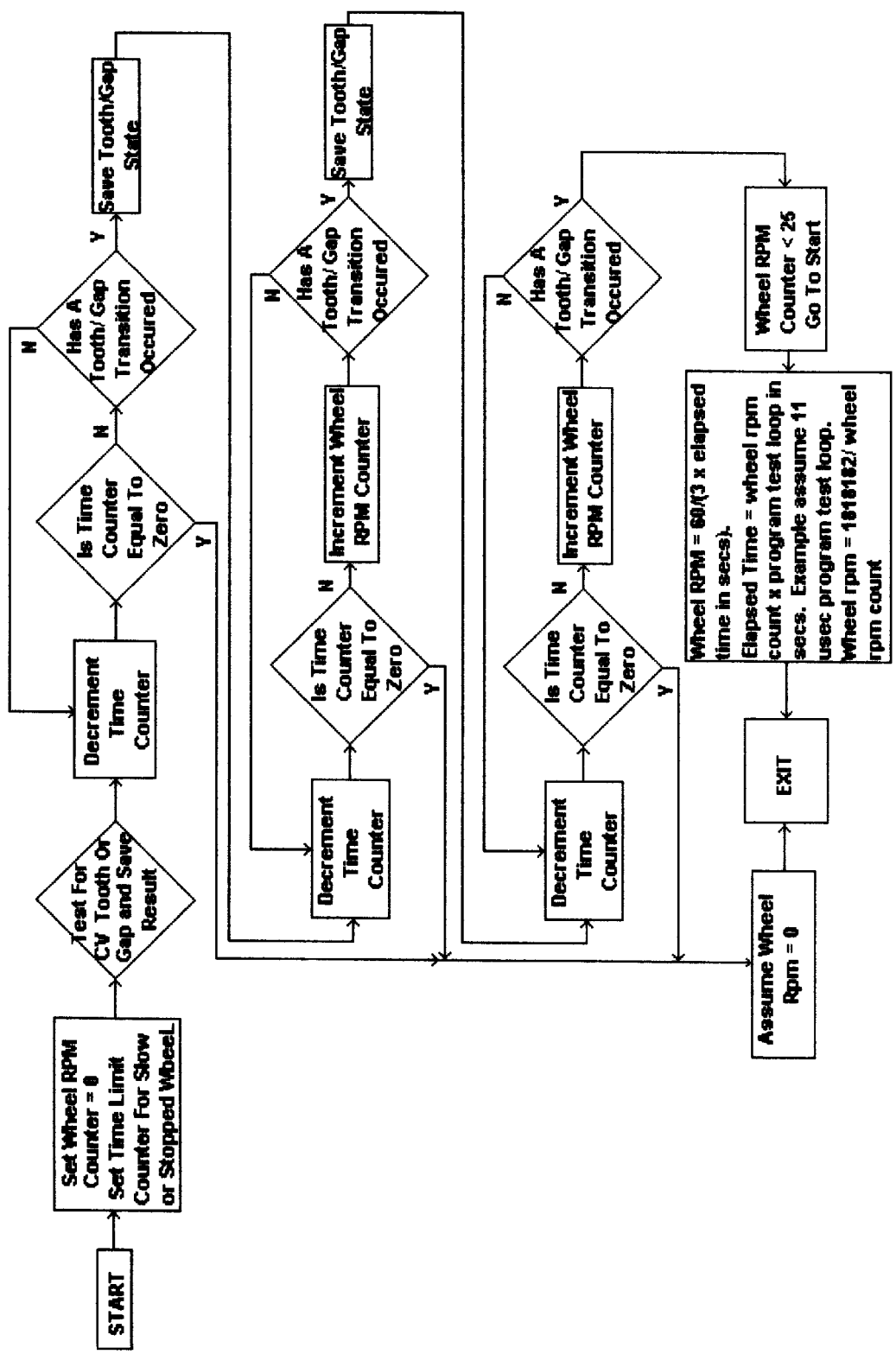
FIG. 6 is a data flow diagram depicting the provision of a wheel speed signal to the motor control system within the arrangement of FIG. 4.

FIG. 6 is a flow chart which shows the logic for measuring wheel speed using the inner CV joint of a vehicle. To start a wheel rpm counter is set to zero and a time limit counter is set to limit measuring time for a slow or stopped wheel speed. For example if the measuring CPU uses a 2 MHz crystal it has a 500 nanosecond clock cycle rate. A test for a transition between being over a tooth or a gap in the CV joint plus decrementing the time limit counter and incrementing the up counter may take as little as 11 microseconds of program instructions.

Assuming it is required to measure wheel rpms as low as 120 rpm or 2 rev/sec. The time for one revolution at a 2 rev/sec rate is 500 MS. But all that is required to be measured is ⅓ of a revolution since the three teeth and three gaps in a CV joint are uniform in size. Thus a minimum of 500/3=166.67 MS is required. Thus a minimum count of 166670/11=15152 is required to measure rpms down to 120 rpm. So setting the time limit counter to a value of 15152 counts will limit test time to 167 MS and will assume all rpms below 120 are zero in value. All higher wheel speeds take less measurement time hence leave more time for control.

The time out counter is decremented continuously until a transition between tooth and gap occurs. As soon as a transition is noticed up counting begins of the wheel rpm counter. This continues until a second and then a third transition are identified. The total count will reflect the time for one complete tooth and one complete gap. These typically are not equal but this is not important.

The total counts×11 microseconds represents an accurate measure of the time for ⅓ of a revolution. Wheel rpm=60/ 3×elapsed time in secs. Elapsed time in seconds =wheel rpm count ×minimum programmed test loop. Thus wheel rpm= 1818182/wheel rpm count for a 11 microsecond minimum programmed test loop.

On very bumpy roads three transitions can occur very quickly with a very low count typically of 2 to 4. By requiring a reread for very low counts these errors are easily eliminated with negligible penalty.

CONCLUSION

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The embodiments of the invention in which an exclusive property or privilege is claimed are defined as follows:

1. An AC motor control system comprising an AC motor with a field coil and rotor and a motor controller to provide power to the field coil to create a rotating magnetic field within the motor in combination with a wheeled vehicle having a vehicle powertrain that includes a multi-ratio, shiftable transmission connected between the rotor and the vehicle wheels wherein the motor controller comprises current suspension means to suspend the flow of current to the field coil when the controller senses that a transmission ratio shift is in progress within the vehicle powertrain in order to ensure that a mismatch of the rotational velocity of the powered magnetic field of the field coil and the rotor is not sustained during a transmission shift change.

2. A control system as in claim 1 comprising wheel speed and rotor speed sensors and wherein said current suspension means comprises comparator means for comparing consecutive values for the rotor to wheel speed ratio to establish whether a change in the rotor to wheel speed ratio has occurred that indicates that the rotor is decoupled from the powertrain and means to thereupon provide a signal to the current suspension means to suspend current flow to the field coil.

3. A control system as in claim 1 wherein the motor controller comprises, for use after sensing a transmission ratio shift within the vehicle powertrain, reactivation means to effect reactivation of the field coil by the provision of current thereto, said reactivation means operating only once the rotor has stabilized at a new rotational speed that corresponds to re-engagement of the rotor to the powertrain.

4. A control system as in claim 3 comprising wheel speed and rotor speed sensors and wherein said reactivation means comprises re-engagement determining means connected to receive outputs from the wheel speed and rotor speed sensors for determining the ratio of these speeds and for comparing the result to a table of known transmission ratios to establish whether the rotor is fully coupled to the powertrain and thereupon to provide a signal to the reactivation means to reactivate the field coil.

5. A control system as in claim 4 wherein said re-engagement determining means comprises confirmatory engagement means to permit the reactivation means to reactivate the field coil only upon determining that two consecutive ratios for wheel speed to rotor speed are substantially of the same value.

6. A control system as in claim 2, in combination with a front wheel drive vehicle having a transaxle case mounted on the vehicle chassis and linkages connected between shafts protruding from the transaxle case and rotary linkages extending to the wheels, said wheel speed sensor comprising a pickup for sensing rotation of said shafts, said pickup being mounted on the transaxle case and positioned to detect the rotation of at least one of said shafts and provide a wheel speed output signal corresponding thereto to the comparator means.

7. A control system as in claim 4, in combination with a front wheel drive vehicle having a transaxle case mounted on the vehicle chassis and linkages connected between shafts protruding from the transaxle case and rotary linkages extending to the wheels, said wheel speed sensor comprising a pickup for sensing rotation of said shafts, said pickup being mounted on the transaxle case and positioned to detect the rotation of at least one of said shafts and provide a wheel speed output signal corresponding thereto to the comparator means.

8. A control system as in claim 6 wherein the shaft carries a CV joint having an outside steel sleeve that is interrupted at by indentation portions that provide edges, the pickup being positioned to sense the passage of said edges.

9. A control system as in claim 7 wherein the shaft carries a CV joint having an outside steel sleeve that is interrupted at by indentation portions that provide edges, the pickup being positioned to sense the passage of said edges.

* * * * *